United States Patent [19]

Iguchi et al.

[11] Patent Number: 5,619,339
[45] Date of Patent: Apr. 8, 1997

[54] IMAGE REPRODUCTION DEVICE FOR REPRODUCING IMAGE DATA FROM VIDEO DISKS

[75] Inventors: Masayoshi Iguchi, Nagoya; Kazuhiko Omura, Tokai; Masatoshi Yoshiyama; Hiroshi Nishikawa, both of Nagoya, all of Japan

[73] Assignee: Brother Kogyo Kabushiki Kaisha/Xing Inc., Nagoya, Japan

[21] Appl. No.: 378,448

[22] Filed: Jan. 25, 1995

[30] Foreign Application Priority Data

Jan. 26, 1994  [JP]  Japan ................................. 6-007071

[51] Int. Cl.⁶ ........................... H04N 5/76; G11B 5/02
[52] U.S. Cl. ......................... 386/113; 360/69; 386/126
[58] Field of Search ................................ 358/342, 335; 348/13, 7, 552; 360/69; 369/92, 54, 30; 371/40.1, 10.1

[56] References Cited

U.S. PATENT DOCUMENTS

| | | | |
|---|---|---|---|
| 5,077,736 | 12/1991 | Dunphy, Jr. et al. | 371/10.1 |
| 5,185,746 | 2/1993 | Tanaka et al. | 371/40.1 |
| 5,233,438 | 8/1993 | Funahashi et al. | |
| 5,233,591 | 8/1993 | Nishihara | 369/54 |
| 5,235,572 | 8/1993 | Tamai | 369/30 |

*Primary Examiner*—Thai Q. Tran
*Assistant Examiner*—Aung S. Moe
*Attorney, Agent, or Firm*—Oliff & Berridge

[57] ABSTRACT

A microcomputer selects one of a plurality of drive units, and controls the selected drive unit to reproduce image data from a video disk located thereon. When a reproduction error occurs in the thus reproducing drive unit, the microcomputer selects another drive unit, and controls the drive unit to reproduce images. Accordingly, it is possible to always provide accurate images.

27 Claims, 4 Drawing Sheets

IMAGE REPRODUCTION DEVICE FOR REPRODUCING IMAGE DATA FROM VIDEO DISKS

BACKGROUND OF THE INVENTION

1. Field of the Invention

The present invention relates to an image reproduction device for reproducing image data from video disks to provide images, such as background images for karaoke system.

2. Description of the Related Art

An image karaoke system is for playing accompaniment music of a song to be sung while displaying the song lyrics superimposed on a background image. Conventionally, there has been known an image karaoke system which reproduces data, from a video disk on image, lyric, and music for each song desired to be sung. Because data for several thousand songs must be stored in each device, an establishment which provides an image karaoke system for its customers must keep an extremely large number of video disks on hand. A special video disk housing case is provided to the image karaoke system for housing several video disks. An autochanger is provided for changing the video disks according to a request by a karaoke user. The space taken up by the autochanger and the special housing case has given rise to a need for a more compact device, especially in establishments that provide karaoke for customers.

U.S. Pat. No. 5,233,438 has proposed a more compact device for solving the above problem, wherein image data (video data) is stored separately from song data. While the song music is played, a background image formed based on the image data is displayed with the lyrics superimposed on the background video. The image data which becomes the background image is stored in video disks. For example, each video disk stores two kinds of image data, such as those appropriate for genres of Japanese ballads (Enka) and popular songs. A video reproduction device is provided for reproducing the background image from the video disks.

With this karaoke system, a background image is retrieved from a video disk according to the genre (i.e., pops, enka, and the like) of the selected song. Ordinarily, background images are sequentially retrieved from the video disk, mixed with lyric data for the selected song, and displayed with the lyrics superimposed thereon.

SUMMARY OF THE INVENTION

However, in the conventional systems, malfunctions in the data retrieval laser or in the motor for driving the laser disk can produce errors in the data retrieved from the laser disk. The errors can result in only lyrics appearing on the video screen or in lyrics superimposed on a distorted or still background image. If the malfunction is not corrected, the same problems can be repeated with the following requested song.

The chance of such problems occurring can be reduced by increasing the frequency of maintenance checks on the karaoke system. However, if malfunctions occur directly after a maintenance check, the problem may reoccur unnoticed the next time a song is requested. Increasing the frequency of maintenance checks not only fails to completely solve the problem, it is also an expensive and troublesome undertaking, so is not a very desirable counter measure.

It is an objective of the present invention to overcome the above-described problems, and to provide an image reproduction device that allows a user to regularly view good background images.

In order to attain the above objective and other objectives, the present invention provides an image reproduction device for reproducing images recorded on a plurality of image disks, the image reproduction device comprising: a plurality of drive units each for reproducing images from image disks; drive unit selecting means for selecting one drive unit from the plurality of drive units; drive unit control means for controlling the drive unit selected by the drive unit selecting means to reproduce images and for controlling another drive unit as a replacement drive unit to reproduce images when a reproduction error occurs in the selected drive unit.

The image reproduction device may further comprise statement recording means for recording a malfunction statement for each of the drive units. When a reproduction error occurs, the drive unit control means may select the replacement drive unit based on the malfunction statements recorded in the statement recording means.

The drive unit control means may select the replacement drive unit by giving priority to drive units with few malfunctions, based on the malfunction statements recorded in the statement recording means.

The statement recording means may record a malfunction statement listing the number of times at which a reproduction error has occurred in each of the plurality of drive units. The drive unit control means may select the replacement drive unit by giving priority to drive units, at which reproduction errors have occurred at small number of times, based on the malfunction statements recorded in the statement recording means.

When a reproduction error occurs in the selected drive unit, the statement recording means may add a count to the number of times at which the corresponding drive unit has generated reproduction error.

The drive unit control means may select the replacement drive unit, in which no reproduction error has occurred or in which reproduction error has occurred at the small number of times.

The reproduction error is categorized in a first category which causes the drive unit to produce some sort of image and a second category which causes the drive unit to produce no image. The drive unit control means may select the replacement drive unit from drive units, in which the reproduction error of the first category has occurred at the number of times lower than a predetermined number.

The plurality of drive units may be classified into two groups, each group being constructed from several number of drive units. The image reproduction device may further comprise switching means for controlling the drive unit selecting means to select one drive unit from the two groups, in alternation, at a predetermined time interval. When a reproduction error occurs in one drive unit that is selected by the drive unit selecting means from one group, the drive unit control means may select the replacement drive unit from the same group or the other group.

According to another aspect, the present invention provides an image reproduction device for reproducing images recorded on a plurality of image disks, the image reproduction device comprising: a plurality of drive units each for reproducing images from image disks; statement recording means for recording a malfunction statement for each of the drive units, the malfunction statement representing how frequency a reproduction error has occurred in the corresponding drive unit; drive unit selecting means for selecting one of the plurality of drive units, based on the malfunction statements for the plural drive units, and for controlling the selected drive unit to reproduce images; and control means for controlling the drive unit selecting means to replace the selected drive unit with another drive unit as a replacement drive unit when a reproduction error occurs in the selected drive unit, the drive unit selecting means selecting the replacement drive unit, based on the malfunction statements for the plural drive units.

According to a further aspect, the present invention provides an image reproduction device for reproducing images recorded on a plurality of image disks, the image reproduction device comprising: a plurality of drive units each for reproducing images from image disks; a drive unit selecting unit for selecting one drive unit from the plurality of drive units; and a drive unit control unit for controlling the drive unit selected by the drive unit selecting unit to reproduce images and for controlling another drive unit as a replacement drive unit to reproduce images when a reproduction error occurs in the selected drive unit. The image reproduction device may further comprise a statement memory for recording a malfunction statement for each of the drive units. When a reproduction error occurs in the selected drive unit, the drive unit control unit may select the replacement drive unit based on the malfunction statements recorded in the statement memory.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE INVENTION

Figure 1:
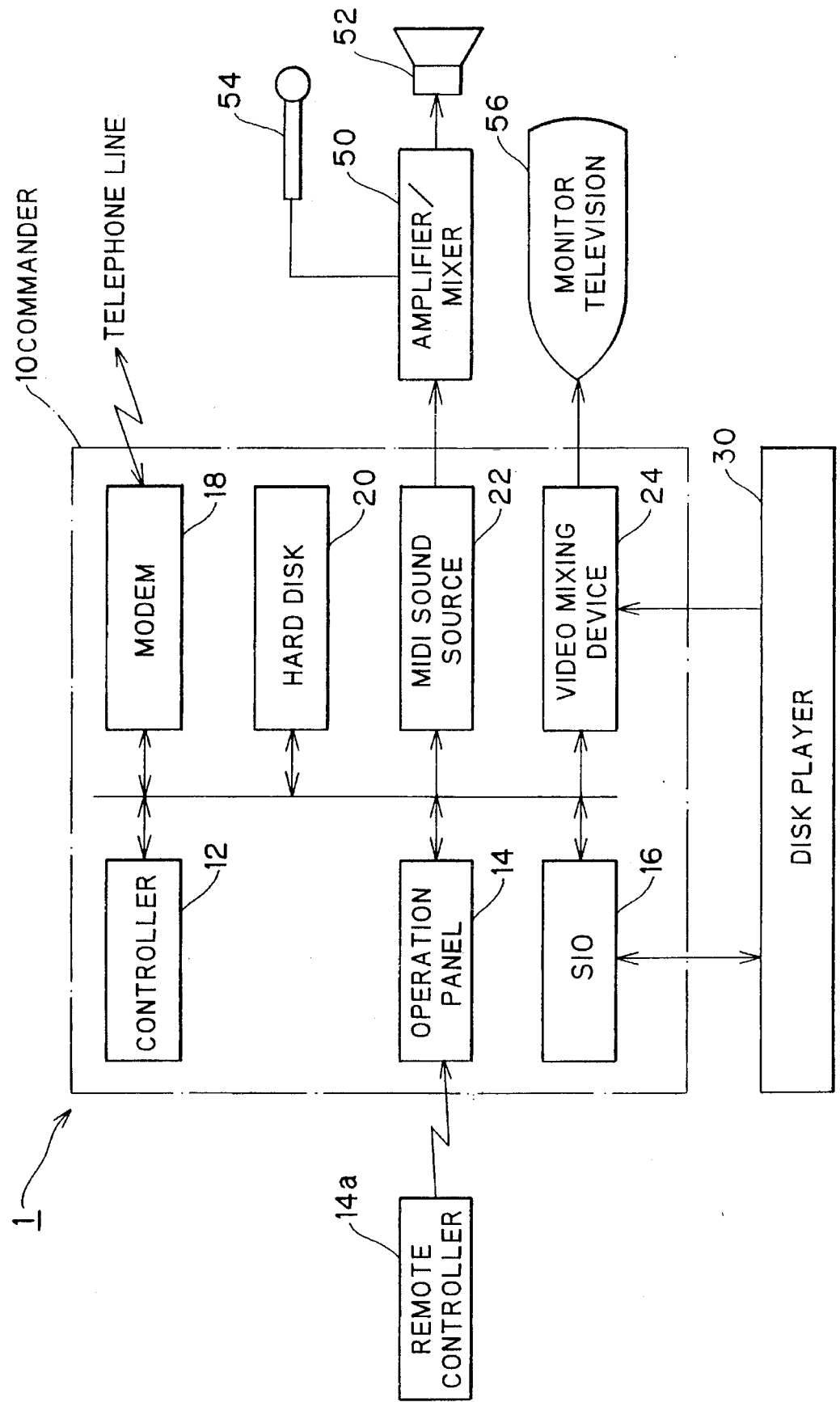
FIG. 1 is a block diagram showing an overall structure of an image karaoke system employing an image reproduction device of an embodiment of the present invention.

An embodiment of an image reproduction device according to the present invention will be described below while referring to the accompanying drawings wherein like parts and components are designated by the same reference numerals to avoid duplicating description.

FIG. 1 shows an image karaoke system employing an image reproduction device of an embodiment of the present invention.

As is shown in FIG. 1, the image karaoke system 1 includes a commander 10, a disk player device 30, an amplifier/mixer 50, a speaker 52, a microphone 54, and a monitor television 56. The disk player device 30 is an embodiment of the image reproduction device of the present invention.

As shown in FIG. 1, the commander 10 includes an operation panel 14, a serial input-output circuit (SIO) 16, a modem 18, a hard disk 20, a MIDI sound source 22, a video mixer 24, and a controller 12 mutually interconnected by a bus line.

The operation panel 14 is for selecting a song desired to be sung by the user, and for adjusting, for example, echo, volume, tone, balance between music and voice volume, and volume of music. The operation panel 14 is provided with a remote control unit 14a so that a user can select music and perform other operations at a distance from the operation panel 14.

The serial input-output circuit (SIO) 16 is connected to the disk player device 30. The serial input-output circuit 16 is an interface circuit for transmitting information on genre (which will be described later) of the selected song to the disk player device 30 via a serial transmission line 17. In the present embodiment an RS232C cable is used for the transmission line 17.

The modem 18 is a modulation-demodulation unit connected to a telephone line. The modem 18 is for modulating signals sent to an external device (host computer) transmitted through, and for demodulating a signal received through, a transmission path via the telephone line. An example of a signal modulated by the modem 18 would be a signal containing information on types and frequency of songs requested by users. An example of a signal demodulated by the modem 18 would be a signal containing new song data, for continuously providing the karaoke system 1 of the present embodiment with new song data, sent during the night from the host computer to the commander 10 via the telephone line. The demodulated signal would then be stored in the hard disk 20.

The hard disk 20 is a memory unit for storing song data of a plurality of karaoke songs selectable by the user to be sung. The song data for each of the plurality of karaoke songs includes music data and lyric data. The music data is in the form according to a musical instrument digital interface (MIDI) standard.

The MIDI sound source 22 is connected to the amplifier/mixer 50 and is for storing musical sounds of various instruments. The MIDI sound source 22 is a sound source for producing music signals of various instruments based on the music data sent from the hard disk 20. The MIDI sound source 22 sends instrument music signal produced therein to the amplifier/mixer 50.

The video mixer 24 is connected to the disk player device 30 and the television monitor 56. The video mixer 24 is for superimposing lyric data sent from the hard disk 20 onto an NTSC image signal sent from the disk player device 30. The video mixer 24 tints lyrics that are displayed on the monitor television 56 in synchronization with output of the instrumental music so that the user knows which part of the music is being played.

The controller 12 is a microcomputer for controlling the entire commander 10. The controller 12 performs various controls such as, determining a genre of the selected song, transmitting information on the genre to the disk player device 30, consecutively retrieving the music data and lyric data for the selected song from the hard disk 20 according to the progress of the music of the song, and sending lyric data to the video mixer 24 and music data to the MIDI sound source 22.

Figure 2:
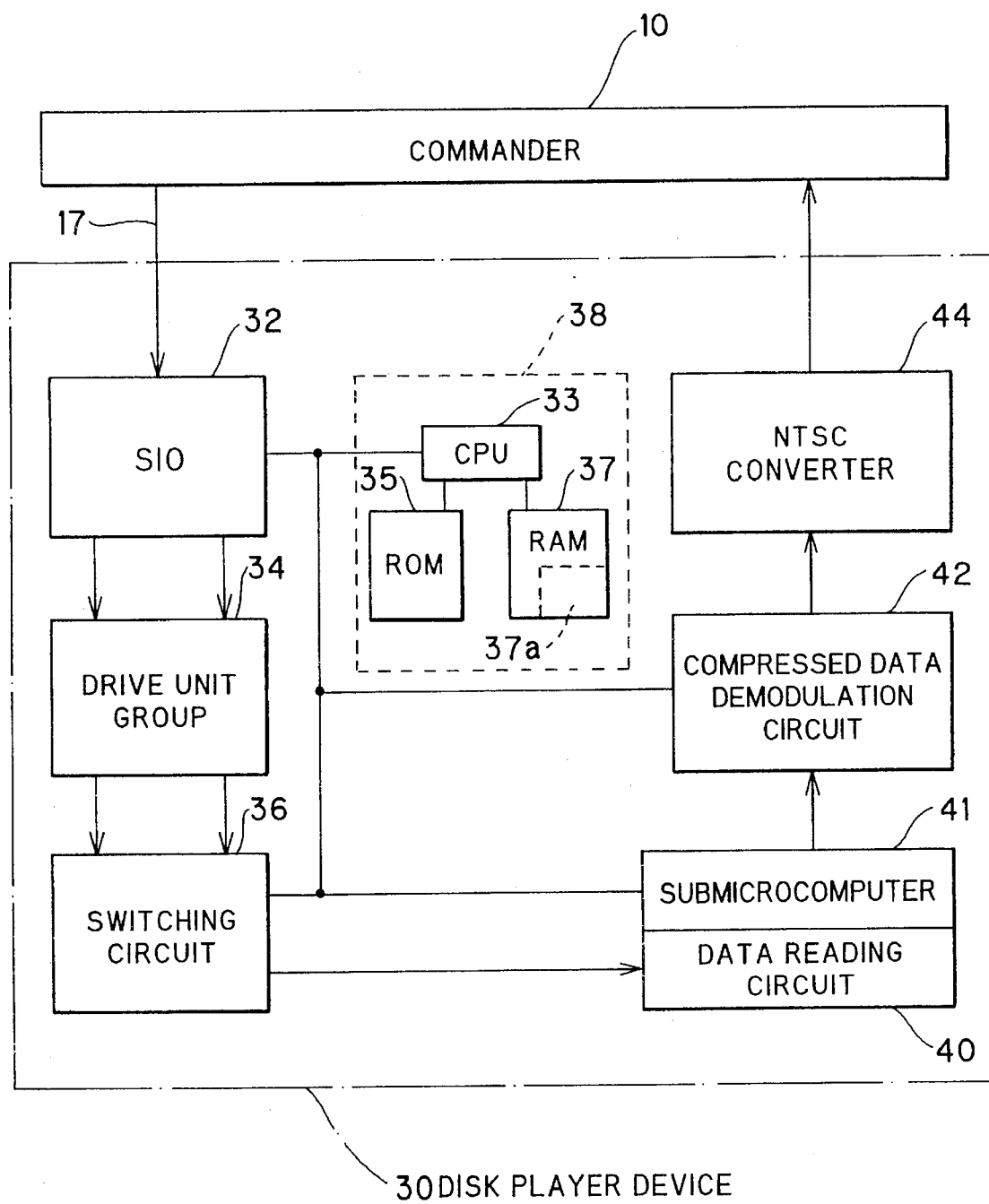
FIG. 2 is a block diagram showing a structure of a disk player device to which applied the embodiment of the present invention.

Next, an explanation will be provided for the disk player device 30 while referring to FIG. 2. The disk player device 30 is for reproducing, from video disks, video data of a genre of the selected karaoke song indicated by the commander 10 and for transmitting, to the commander 10, the reproduced video data as NTSC (National Television System Committee) image signals.

The disk player device 30 includes a serial input/output circuit (SIO) 32, a drive unit group 34, a switch circuit 36, a microcomputer 38, a data reading circuit 40, a compressed data demodulation circuit 42, and a NTSC convertor 44.

The serial input/output circuit (SIO) 32 is an interface circuit for receiving the information on the genre of the selected song sent from the commander 10.

Figure 3:
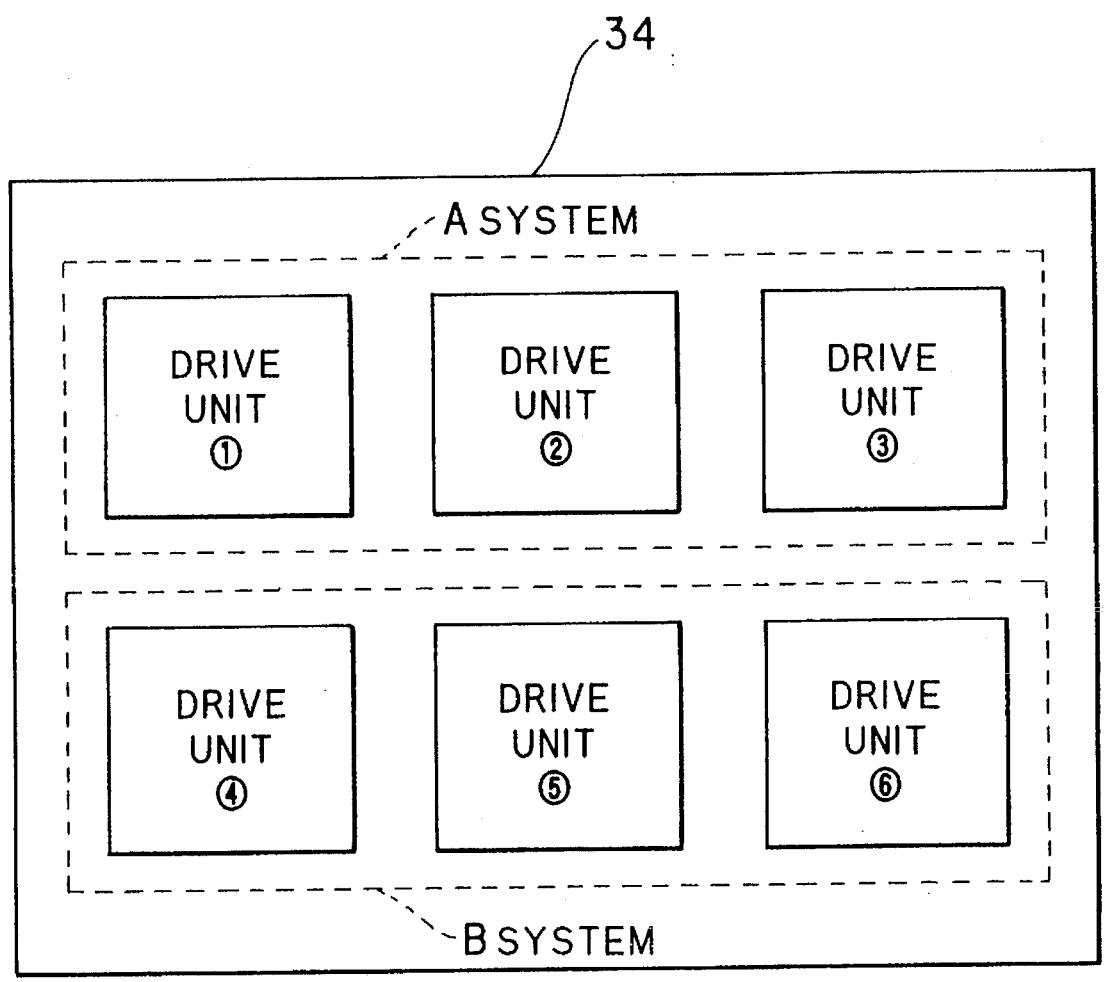
FIG. 3 is a block diagram showing a structure of a drive unit group employed in the disk player device.

The drive unit group 34 is connected to the serial input/output circuit 32. As shown in FIG. 3, the drive unit group 34 includes systems A and B to which are allocated drive units (1) through (6). In this example, drive units (1) through (3) are allocated to system A and drive units (4) through (6) are allocated to system B. A switch circuit 36 is connected to the drive unit group 34 for switching which drive unit of the drive unit group 34 sends an image signal to the data retrieving circuit 40. Each of the drive units (1) through (6) is for selecting and reproducing chapters of appropriate genre from a video disk, as will be described later. Each drive unit is a disk player having a well-known structure and having one video disk located thereon.

The video disks used in the present embodiment are the size of 12 cm compact disks (CD). Video data is stored in each of the image reproduction disks in compressed form according to Moving Picture Image Coding Experts Group (MPEG) standards. Because the video data is in compressed form, each CD size disk contains one hour of images. The video data stored in each video disk represents a plurality of separate video units, each video unit being a video of 30 seconds long, for example. This 30-second video unit is referred to as "chapter," in the present specification. The chapters are edited separately so that no particular story or plot connects these plural chapters. The plural chapters are classified into several genres corresponding to several contents or gists, into which a plurality of karaoke songs are categorized.

The switching circuit 36 is a circuit connected to the drive unit group 34 for switching among transmission from the drive units (1) through (6) of video in the compressed form to the data reading circuit 40. For example, the switching circuit 36 performs to switch the systems A and B in alternation at a fixed time interval (30 seconds, for example) while a drive unit of each system reproducing the chapters of the genre of the song.

The data reading circuit 40 includes a sub-microcomputer 41 and is for reading, as digital data, the compressed image data sent from the switching circuit 36. The digital data read by the data reading circuit 40 is sent to the compressed data demodulation circuit 42. The compressed data demodulation circuit 42 is an electrical circuit for demodulating the compressed digital data sent from the data reading circuit 40 into an image signal. The image signal thus demodulated by the compressed data demodulation circuit 42 is sent to the NTSC convertor 44. The NTSC convertor 44 is an electrical circuit for converting the image signal demodulated by the compressed data demodulation circuit 42 into a commercial television signal (NTSC). The NTSC image signal converted by the NTSC convertor 44 is sent to the video mixer 24 of the commander 10.

The microcomputer 38 is for controlling overall operation of the disk player devices 30. The microcomputer 38 is constructed from a CPU 33 and a ROM 35 and a RAM 37 connected to the CPU 33. The RAM 37 has a memory area 37a in which a malfunction statement memory is formed for storing a malfunction state of each of the drive units (1) through (6). The malfunction state lists the number of times, at which a reproduction error has occurred in the corresponding drive unit. The microcomputer 38 performs an operation based on the malfunction state stored in the malfunction state memory. The RAM 37 may preferably be made from an electrically erasable programmable memory (EEPROM) in order to store the malfunction statements even after the device 30 is turned off.

Figure 4:
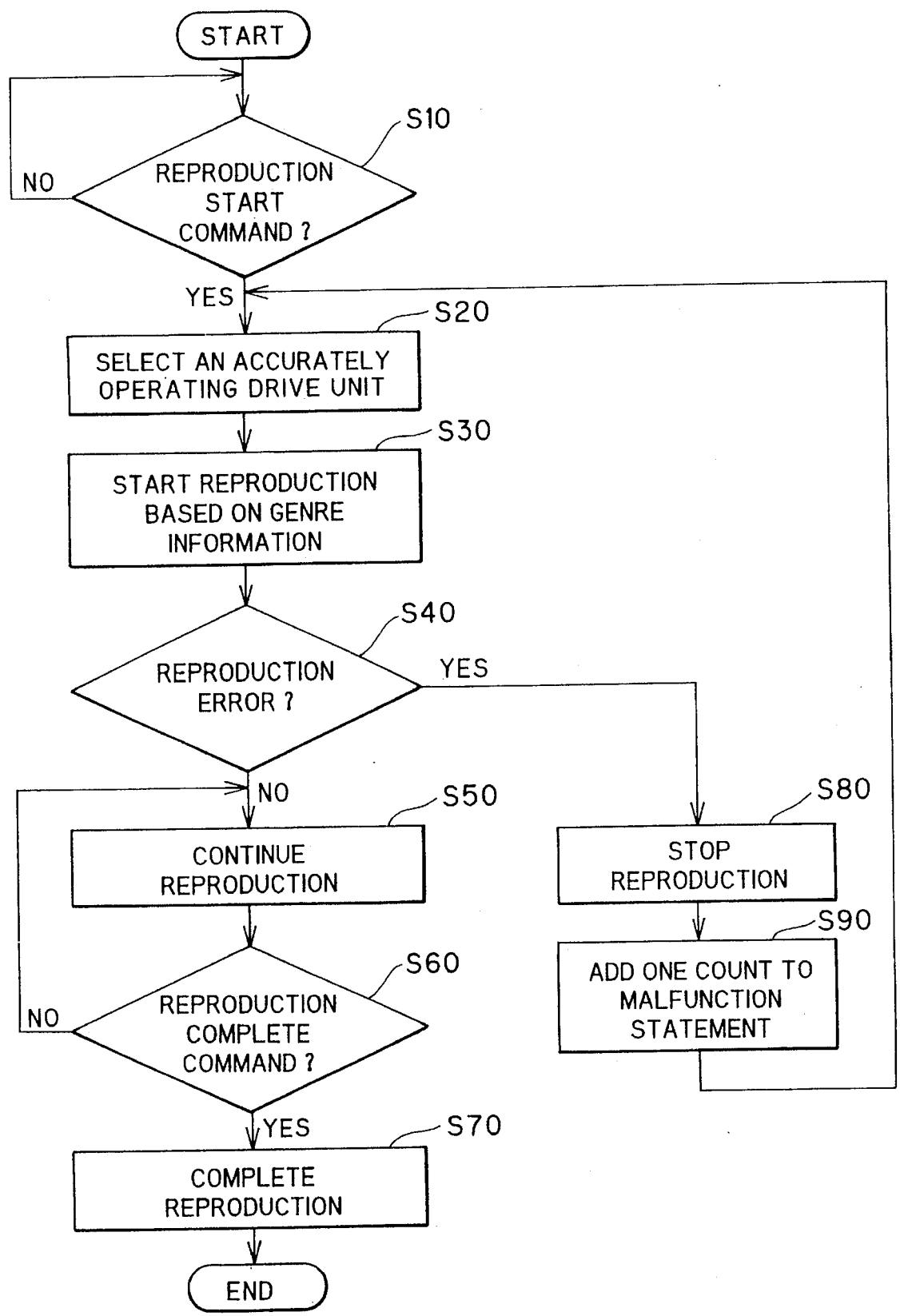
FIG. 4 is a flowchart showing processes implemented by a microcomputer in the disk player device.

The ROM 35 stores a control program for controlling the CPU 33 to conduct an operation routine shown in FIG. 4. It is noted that when a user selects a song he or she wants to sing by operating the operation panel 14 or the remote control unit 14a, a reproduction start command and information on the genre of the selected song (i.e., Japanese ballad or pops) are sent to the serial input/output circuit 32 of disk player device 30 from the serial input/output circuit 16 of the commander 10.

As shown in FIG. 4, the disk player 30 first waits for a reproduction start command in step 10. (Hereinafter individual steps will be referred to simply as S and the step number.) When a reproduction start command is inputted (i.e., S10 is YES), the CPU 33 selects, from the six drive units (1) through (6), one drive unit that is judged to be accurately operating according to the malfunction statement memory, in S20. In S30, the selected drive unit starts image reproduction based on the genre information.

S40 judges whether a reproduction error occurs in the thus operating drive unit. A reproduction error is any problem, such as a malfunction in the motor of the drive unit or a malfunction in the laser for reading data from the video disk, that prevents retrieving an image from the video disk. When reproduction is going smoothly (i.e., S40 is NO), reproduction is continued in S50. When an NTSC image signal is sent from the disk player 30, the commander 10 superimposes the lyrics on the NTSC image signal and displays the resultant composite image. The commander 10 also mixes and outputs the instrumental music with the user's voice. When the song is completed, a reproduction completion signal is sent to the disk player 30.

Reproduction can be stopped according to, for example, a time duration sent with the reproduction start command of the selected song. In this case, the disk player 30 can be set to automatically stop reproduction from the video disk when the end of the song arrives as judged by the time duration information. Image reproduction need not be stopped simultaneously with the completion of the song. For example, the NTSC image signal can be transmitted after the song is completed until the presently reproduced image chapter is finished.

In S60, whether the disk player 30 has inputted a reproduction completion command is determined. If not (i.e., S60 is NO), the program returns to S50. If so, reproduction is completed in S70 and the program ends.

If a reproduction malfunction is determined in S40 (i.e., S40 is YES), reproduction is terminated in S80 and a count is added to the malfunction statement of that drive unit in S90. In other words, one is added to the number of error occurring times for that drive unit. The program then returns to S20. In S20, an accurately operating unit is selected according to the malfunction statements in the statement memory. In this S20 a drive unit other than those with a count in their corresponding malfunction statement is selected. More specifically, S20 selects one drive unit other than the drive unit that has just created the error. S20 selects one drive unit, in which no error has been occurred. In S30, reproduction is again started using the presently-selected drive unit. If a reproduction malfunction is again determined in S40, a count is added to the malfunction statement of that drive unit also (S90) and the program returns to S20.

An example process will be described while referring to FIG. 3. If a reproduction error occurs when reproduction is started in drive unit (1), one of the other drive units (2) through (6), for example, drive unit (2), is selected. If a reproduction error also occurs in drive unit (2), one of the other drive units (3) through (6) are selected from. This process is repeated.

Various methods can be contemplated for reproducing images with the drive units of system A and system B. For example, system A and B can be switched between at a regular interval (for example every 30 seconds). Reproduction can be performed randomly or in order from one unit of the selected system. Accordingly, when a normally operating unit is selected according to the statement memory, for example, when a retrieval error occurs in an A system drive unit, the microcomputer 38 detects this and, via the switch circuit 36, causes images to be retrieved by system B. Images will be retrieved that suit the song based on the genre information of the song received from the commander 10. Alternatively, a smoothly operating unit from the same system A can be switched to for reproduction.

As described above, according to the present invention, a count is added to the malfunction statement of the drive unit which is reproducing an image from a video disk when a retrieval error occurs. Reproduction is performed using a drive unit other than the malfunctioning drive unit. This set up allows switching retrieval disks as soon as a retrieval error occurs. Therefore, smooth image reproduction is possible. A user is not inconvenienced by having to watch erratic background images.

By setting up the system so that priority for reproducing images is given to drive units with good track records, that is, with few malfunctions that cause retrieval errors, drive units that malfunction frequently are used less often so as to insure providing users with error-free background images. That is, S20 in FIG. 4 is controlled to select one drive unit, in which errors has occurred at the small number of times.

Drive units with poor track records can be further classified by their type of malfunction. That is, those drive units that produce some sort of image even though not the best possible image when malfunctioning and those drive units that produce no image when malfunctioning. Those drive units that produce some kind of image can be set as a candidate for reproduction, even if given only a low priority, until a predetermined number of errors occurs. Once the predetermined number is reached, the drive unit is not selected as a candidate for reproducing images.

To operate the image karaoke system 1 employed with the above-described image reproduction device 30, a user chooses a song he/she wants to sing by manipulating the operation panel 14 of the commander 10 or the remote controller 14a. Then, the controller 12 starts retrieving the song data for the selected song from the hard disk 20. The controller 12 transmits information on the genre of the selected song through the SIO circuit 16 to the SIO circuit 32 of the disk player device 30. Then, the controller 12 consecutively retrieves lyric data and music data of the song data, in accordance with the progress of the song. The controller 12 transfers the lyric data to the video mixer 24. The controller 12 transfers the music data to the MIDI sound source 22. The lyric data and the music data are thus retrieved and supplied to the corresponding devices, in synchronization.

In the disk player device 30, the CPU 33 executes the program of FIG. 4 to select a drive unit in the drive unit group 34 and to control the selected drive unit to reproduce chapters of the commander-indicated genre from a video disk located thereon. The switching circuit 36 is controlled by the CPU 38 to transfer the image data from the selected drive unit to the data reading circuit 40. The image data thus transferred to the data reading circuit 40 is further transferred to the demodulation circuit 42 and the NTSC converter 44 where the image data is transformed into NTSC image signals. The NTSC image signals are transferred from the NTSC converter 44 to the video mixer 24 of the commander 10. Thus, the disk player device 30 serves to reproduce image data from the video disks, produces the NTSC image signals, and transfers the NTSC image signals to the video mixer 24.

In the video mixer 24, the NTSC image signals are superimposed with the lyric data supplied from the hard disk 20, in synchronization with the music data, to produce composite image signals that are displayed on the monitor television 56. The NTSC image signals become the background scene on the monitor television 56. The thus obtained background image is of a genre that properly matches the theme, content, and the like of the song selected by the user.

The music data supplied to the MIDI sound source 22 is transformed into analog instrumental music signals. The analog music signals are sent to the amplifier/mixer 50 where they are electrically amplified and mixed at an appropriate rate with the voice of the user who is singing the song into the microphone 54 in time with the music while referring to the lyrics. The signals with the music and voice mixed therein are outputted by the speaker 52.

As explained above, in an image reproduction device according to the present invention, retrieval disk can be switched as soon as a retrieval error occurs. Therefore, a user can view only well-produced images, thereby increasing enjoyment of the karaoke experience.

By replacing a malfunctioning drive unit with a smoothly operating drive unit based on the recorded malfunction statement, users will be shown background images with few errors. It is desirable to select replacement drive units by giving priority to drive units with few malfunctions.

While the invention has been described in detail with reference to the specific embodiment thereof, it would be apparent to those skilled in the art that various changes and modifications may be made therein without departing from the spirit of the invention, the scope of which is defined by the attached claims.

For example, in the preferred embodiment, drive units are described as being divided between two systems A and B. However, drive units can be divided between more than two systems, for example, between four systems A through D. Also, the present invention can be applied for systems other than image karaoke systems. The same set up can be used for providing background music or background videos to eating and drinking establishments and to special event grounds.

In the above-described embodiment, each of the drive units (1)–(6) is a disk player having a single video disk set thereon. However, each of the drive unit (1)–(6) may be provided with an autochanger having a well-known structure. The autochanger may house several video disks therein and sets one of the video disks on the disk player. The disk player reproduces video data from the video disk thus set thereon.

What is claimed is:

1. An image reproduction device for reproducing images recorded on a plurality of image disks, the image reproduction device comprising:

a plurality of drive units each for reproducing images from image disks;

drive unit selecting means for selecting one drive unit from said plurality of drive units;

drive unit control means for controlling the drive unit selected by said drive unit selecting means to reproduce images and for controlling another drive unit as a replacement drive unit to reproduce images when a reproduction error occurs in the selected drive unit; and statement recording means for recording a malfunction statement for each of said drive units, said drive unit control means selecting the replacement drive unit by giving priority to drive units with fewer malfunctions based on the malfunction statements recorded in said statement recording means.

2. An image reproduction device as claimed in claim 1, wherein said statement recording means records a malfunction statement listing the number of times at which a reproduction error has occurred in each of the plurality of drive units, and wherein said drive unit control means selects the replacement drive unit by giving priority to drive units, at which reproduction errors have occurred less frequently than in a remainder of the drive units, based on the malfunction statements recorded in said statement recording means.

3. An image reproduction device as claimed in claim 1, wherein said statement recording means records a malfunction statement listing the number of times at which a reproduction error has occurred in each of the plurality of drive units.

4. An image reproduction device as claimed in claim 3, wherein when a reproduction error occurs in the selected drive unit, said statement recording means adds a count to the number of times at which the corresponding drive unit has generated reproduction error.

5. An image reproduction device as claimed in claim 4, wherein said drive unit control means selects the replacement drive unit, in which no reproduction error has occurred.

6. An image reproduction device as claimed in claim 4, wherein said drive unit control means selects a replacement drive unit, in which the reproduction error has occurred less frequently than in a remainder of the drive units.

7. An image reproduction device as claimed in claim 4, wherein the reproduction error is categorized in a first category which causes the drive unit to produce an image and a second category which causes the drive unit to produce no image, and wherein said drive unit control means selects the replacement drive unit from drive units, in which the reproduction error of the first category has occurred at the number of times lower than a predetermined number.

8. An image reproduction device as claimed in claim 5, wherein the plurality of drive units are classified into several groups, each group being constructed from several number of drive units, and further comprising switching means for controlling the drive unit selecting means to select one drive unit from the several groups, in alternation, at a predetermined time interval.

9. An image reproduction device as claimed in claim 8, wherein when a reproduction error occurs in one drive unit that is selected by the drive unit selecting means from one group, said drive unit control means selects the replacement drive unit from other groups.

10. An image reproduction device as claimed in claim 8, wherein when a reproduction error occurs in one drive unit that is selected by the drive unit selecting means from one group, said drive unit control means selects the replacement drive unit from the same group.

11. An image reproduction device as claimed in claim 1, wherein the drive unit selecting means selects one drive unit at a time from said plurality of drive units, the drive unit control means controlling the selected drive unit to reproduce images at a time.

12. An image reproduction device as claimed in claim 11, further comprising display means for displaying the images reproduced at the selected drive unit.

13. An image reproduction device as claimed in claim 1, wherein said drive unit control means selects the replacement drive unit by giving priority to drive units with the fewest malfunctions based on the malfunction statements recorded in said statement recording means.

14. An image reproduction device as claimed in claim 13, wherein said statement recording means records a malfunction statement listing the number of times at which a reproduction error has occurred in each of the plurality of drive units, and wherein said drive unit control means selects the replacement drive unit by giving priority to drive units, at which reproduction errors have occurred at the smallest number of times, based on the malfunction statements recorded in said statement recording means.

15. An image reproduction device as claimed in claim 13, wherein said statement recording means records a malfunction statement listing the number of times at which a reproduction error has occurred in each of the plurality of drive units.

16. An image reproduction device for reproducing images recorded on a plurality of image disks, the image reproduction device comprising:

a plurality of drive units each for reproducing images from image disks;

statement recording means for recording a malfunction statement for each of said drive units, the malfunction statement representing how frequently a reproduction error has occurred in the corresponding drive unit;

drive unit selecting means for selecting one of the plurality of drive units, based on the malfunction statements for the plural drive units, and for controlling the selected drive unit to reproduce images; and control means for controlling the drive unit selecting means to replace the selected drive unit with another drive unit as a replacement drive unit when a reproduction error occurs in the selected drive unit, the drive unit selecting means selecting the replacement drive unit by giving priority to drive units with fewer malfunctions, based on the malfunction statements for the plural drive units.

17. An image reproduction device as claimed in claim 16, wherein said statement recording means records a malfunction statement listing the number of times at which a reproduction error has occurred in each of the plurality of drive units.

18. An image reproduction device as claimed in claim 17, wherein when a reproduction error occurs in the selected drive unit, said statement recording means adds a count to the number of times at which the corresponding drive unit has generated reproduction error.

19. An image reproduction device as claimed in claim 18, wherein said control means controls the drive unit selecting means to select the replacement drive unit by giving priority to drive units, at which reproduction errors have occurred less frequently than in a remainder of the drive units, based on the malfunction statements recorded in said statement recording means.

20. An image reproduction device as claimed in claim 16, further comprising monitor display for displaying the images reproduced at the selected drive unit.

21. An image reproduction device as claimed in claim 16, wherein the drive unit selecting means selects the replacement drive unit by giving priority to drive units with the fewest malfunctions, based on the malfunction statements for the plural drive units.

22. An image reproduction device for reproducing images recorded on a plurality of image disks, the image reproduction device comprising:

- a plurality of drive units each for reproducing images from image disks;
- a drive unit selecting unit for selecting one drive unit from said plurality of drive units; and
- a drive unit control unit for controlling the drive unit selected by said drive unit selecting unit to reproduce images and for controlling another drive unit as a replacement drive unit to reproduce images when a reproduction error occurs in the selected drive unit, said drive unit control unit selecting the replacement drive unit by giving priority to drive units with fewer malfunctions.

23. An image reproduction device as claimed in claim 22, further comprising a statement memory for recording a malfunction statement for each of said drive units, wherein, when a reproduction error occurs in the selected drive unit, said drive unit control unit selects the replacement drive unit by giving priority to drive units with fewer malfunctions based on the malfunction statements recorded in said statement memory.

24. An image reproduction device as claimed in claim 23, wherein the drive unit selecting unit selects one drive unit at a time from said plurality of drive units, the drive unit control unit controlling the selected drive unit to reproduce images at a time.

25. An image reproduction device as claimed in claim 24, further comprising monitor means for displaying the images reproduced at the selected drive unit.

26. An image reproduction device as claimed in claim 23, wherein said drive unit control unit selects the replacement drive unit by giving priority to drive units with the fewest malfunctions.

27. An image reproduction device as claimed in claim 22, wherein said drive unit control unit selects the replacement drive unit by giving priority to drive units with the fewest malfunctions.

* * * * *